United States Patent [19]

Marks

[11] Patent Number: 4,630,097
[45] Date of Patent: Dec. 16, 1986

[54] 2D/3D COMPATIBLE POLARIZED COLOR TV SYSTEM

[76] Inventor: Alvin M. Marks, Bigelow Rd., Athol, Mass. 01331

[21] Appl. No.: 523,705

[22] Filed: Aug. 16, 1983

[51] Int. Cl.$^4$ ............... H04N 15/00; H04N 13/00; H04N 13/02
[52] U.S. Cl. ............................. 358/3; 358/92; 313/466; 313/474; 264/1.3; 427/68
[58] Field of Search ............ 358/3, 92; 313/466, 313/474; 264/1.3; 427/47, 64, 68

[56] References Cited

U.S. PATENT DOCUMENTS

| | | | |
|---|---|---|---|
| 3,429,704 | 2/1969 | Ratliff, Jr. | 358/3 |
| 3,813,265 | 5/1974 | Marks | 350/267 X |
| 3,848,964 | 11/1974 | Marks | 350/362 |
| 4,134,644 | 1/1979 | Marks et al. | 350/132 |
| 4,178,090 | 12/1979 | Marks et al. | 352/60 X |
| 4,214,257 | 7/1980 | Yamauchi | 358/3 |
| 4,504,856 | 3/1985 | Jackman | 358/92 |

FOREIGN PATENT DOCUMENTS 0014269  1/1982  Japan ........................ 358/3

Primary Examiner—Michael A. Masinick
Assistant Examiner—Michael P. Dunnam

[57] ABSTRACT

A 2D/3D compatible polarized TV system is described which comprises a 3 color TV camera with pairs of adjacent 3D right and left images in each color. The image pairs are scanned to derive pairs of 3D image signals. These 3D signals are presented as 3 color pixels alternately polarized orthogonally. The display may be viewed without glasses to see a 2D color image with either the right or left images suppressed; or with polarized viewers to see a color 3D image. A method of manufacturing orthogonally oriented polarized color pixels is described utilizing inorganic polarizing dipoles electrostatically aligned in a fusible transparent coating.

10 Claims, 5 Drawing Figures

2D/3D COMPATIBLE POLARIZED COLOR TV SYSTEM

FIELD OF THE INVENTION

This invention comprises a 2D/3D compatible polarized color cathode ray tube (CRT) system, including a video camera, a polarizing display device, and polarized viewers which will display 2D or 3D color video images.

BACKGROUND

In an earlier U.S. Patent[1], I disclosed a polarizing electrooptic screen employing a suspension of dipolar particles, which is placed over a standard CRT. These dipoles are oriented alternately in the X and Y directions to distinguish two orthogonally polarized stereo images, which are viewed through polarized viewers (eyeglasses) to produce a 3D image.

The inventors Alvin and Mortimer Marks describe a 3D TV system[2], utilizing a 3D TV camera with a dichroic beam splitter in which the right and left stereo images are carried on the standard color signals. The intermixed stereo images on the CRT are separated by color filters mounted in the viewers. The presentation of different color images at the observer's eyes produces a good stereo image; however, the color imbalance causes visual fatigue and discomfort. Accordingly, the inventors sought to overcome this problem by employing polarizers over the color pixels, enabling the viewer to wear standard polarized viewers to separate the images. While this is an improvement, it did not entirely solve the problem, because the CRT images still had color imbalance, although the surroundings appeared normal.

An advantage of this system is that it is compatible with the 3D motion picture standards used in producing and exhibiting modern 3D film filmed in the format employed in the Marks 3Dipex Converter; that is, 2 images, right and left, one over the other with a narrow black bar between them, and with a width/height ratio exceeding 2.

A further advantage of this system is that the 3D color CRT is inherently, automatically 2D/3D compatible without additional circuitry or switches; that is, if a 3D-color signal is transmitted, the CRT of this invention will display 3D color polarized images when seen through polarized viewers; if a (2D) flat color image is transmitted, the CRT of this invention will display a flat color image in the usual manner without viewers. All of the information is processed at the television broadcasting facility using the 3D-TV color camera and associated circuits of this invention; and, displayed on the color-polarized CRT of this invention.

SUMMARY

This invention utilizes a 3D converter for optically placing right and left images one over the other, in each of three 3 color vidicon tubes to produce 3 pairs of R,B,G, colored 3D image pairs. The pairs are scanned and signals transmitted to a 3D Display screen comprising 3 color pixels, adjacent color pixels being polarized orthogonally. In each row pixels of the same color and polarization direction repeat every sixth pixel; and successive rows of pixels of the same color and polarization direction are offset by 1½ the center to center distance between adjacent pixels. This pattern intersperses the right and left images. If only one of the pairs of images is transmitted the screen may be viewed without polarized glasses to see a 2D image; if a pair of 3D color images is transmitted, presented and viewed with polarized glasses, a 3D image is seen. A method of producing 3D colored pixels is described, in which polarizing dipoles are suspended in a fusible coating, and adjacent pixels are oriented orthogonally by a local electric field while the coating is fluid at an elevated temperature.

IN THE FIGURES

FIG. 1 shows a diagram of a complete 2D/3D compatible color TV system.

FIG. 2 is a diagram of the right and left images as they appear at an aperture in a dual scan video camera.

FIG. 3 shows a magnified view of a series of red, blue and green polarized pixels on a small area of the CRT of this invention.

FIG. 4 shows a magnified detailed side view of several elements comprising the CRT-TV screen of this invention.

FIG. 5 shows a device for the in-site manufacture of polarizing elements in the 3D TV CRT of this invention.

DESCRIPTION OF THE FIGURES

The same inventors disclose a 3D optical converter known as the 3Depix ® Camera Converter which enables two images taken horizontally, separated by the interocular distance, to be placed one over the other at an aperture or gate.[3,4,5]

Blanking pulses from a pulse generator 23 are provided to the dual electron guns of tubes 17, 18, and 19 causing the selection of the upper and lower images at different time intervals. The pulse generator 23 controls the alternate presentation of the color and stereo images to the special 3D TV CRT 28. The signal train contains the red, blue and green images and alternates the right and left stereo image signals.

Figure 1:
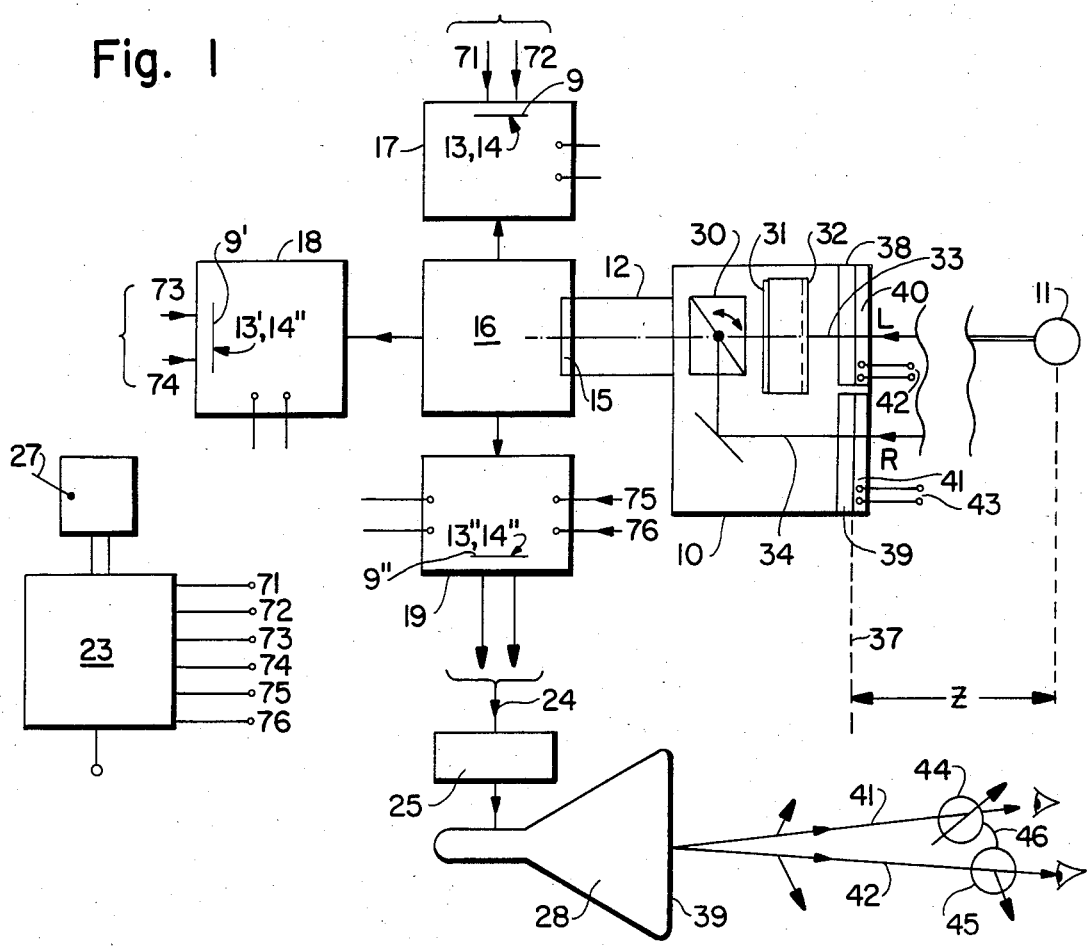
In FIG. 1, there is shown a 3Depix ® Converter 10, an object 11 being photographed, an imaging lens 12 which provides right and left images 13 and 14, shown in FIG. 2, one over the other at the gate 15. An RBG (red, blue and green) prism 16 splits the image into the corresponding colors and images them upon the three Vidicon tubes 17, 18 and 19 which provide the red, blue and green video signal components respectively. Single or dual electron guns may be used. In the preferred configuration shown, there are two electron guns, which impinge on pixels 20 and 21 at positions $X,Y_1$ and $X,Y_2$ on areas 13 and 14 respectively as shown in FIG. 2; in which $Y_1 = Y_2$. Thus the two images 13 and 14 are simultaneously scanned by dual electron beams (not shown) which impinge on the pixels 20 and 21 in each of the color tubes 17, 18 and 19.

Referring to FIG. 1, the control of the color/polarized pixels is established by an enabling pulse circuit 23, which has 6 pulse train outputs 71-76 inclusive; 71, 72 respectively to the control terminals of the right and left dual electron guns 81 and 82 of the red tube 17, 73-74 respectively to the control terminals of the right and left dual electron guns 83 and 84 of the blue tube 18 and 75-76 respectively to the control terminals of the right and left electron guns 85 and 86 of the green tube 19.

Figure 2:
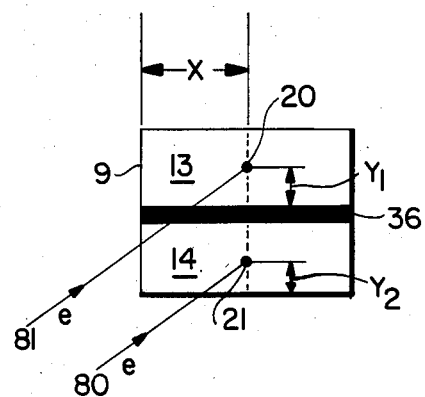
Figure 3:
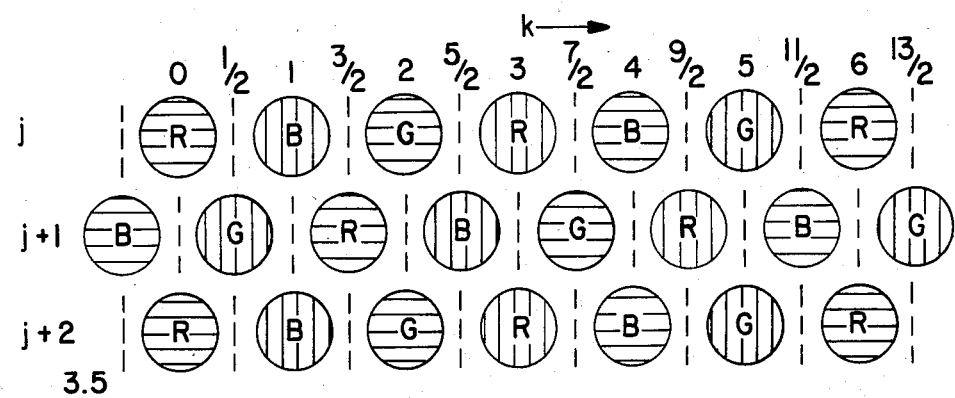

As shown in FIG. 2, in the 3 color tubes 17,18 and 19 the right electron guns 81, 83 and 85 impinge respectively, on the R,B,G right image areas 13,13′,13″; and, left electron guns 82,84 and 86 impinge on the R,B,G left image areas 14,14′,14″. Each pulse train comprises an enabling pulse for an impinging electron beam to actuate each sixth pixel followed by a pulse of opposite polarity to suppress the electron beam for the pixels between the activated pixels. The pulse trains establish the color/polarized pixel matrix on the CRT tube face of this invention, as shown in FIG. 3. Table 1 shows the pulse trains and their corresponding color and polarization directions for right and left stereo images.

TABLE 1

Showing enabling pulse trains for actuating the k pixels corresponding to R,B,G pixels, and the corresponding polarizing directions for right and left stereo images for the even j, j+2, j+4, lines. The odd interlace lines are shifted ½ pixel to make the pattern shown in FIG. 3.

Referring now to FIG. 3, there is shown the j, j+1, and j+2 lines, pixels k, k+1, k+2 and k+3 are located on the j and j+2 lines. The interlaced lines j+1 and j+3 pixels are at K+0.5, K+1.5, K+2.5 etc. The pixel elements on each line are alternately polarized orthogonally; for example, oriented as shown at 0° and 90°. This configuration provides the most intimate intermixture of the right and left orthogonally polarized stereo images.

Figure 4:
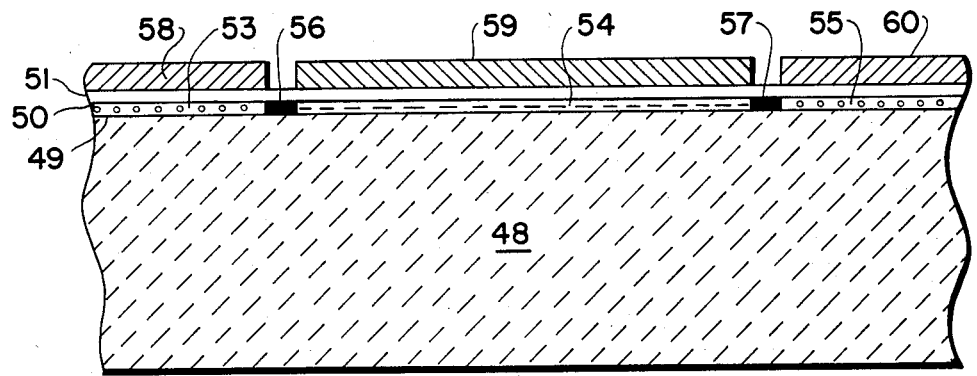

FIG. 4 shows a magnified sectional view of the polarized and color phosphor elements. A section of the tube face 48 is shown, the inner surface 49 being coated with a thin layer 50 of polarizing material oriented as shown. The layer thickness of 50 maybe, for example, 5 to 10 μm. In this example, polarizing elements 53 and 55 are shown with the polarizing direction oriented normal to the diagram, and element 54 is shown with the polarizing direction oriented in the plane of the diagram. In the

| DESCRIPTION | | | | PIXEL No. (+ON/−OFF) | | | | | | | | |
|---|---|---|---|---|---|---|---|---|---|---|---|---|
| COLOR | POLARIZED DIRECTION | STEREO IMAGE | PULSE TRAIN | k | k+1 | k+2 | k+3 | k+4 | k+5 | k+6 | k+7 | k+8 |
| R | — | R | 71 | +/− | | | | | | | | |
| B | \| | L | 73 | +/− | | | | | | | | |
| G | — | R | 75 | +/− | | | | | | | | |
| R | \| | L | 72 | +/− | | | | | | | | |
| B | — | R | 74 | +/− | | | | | | | | |
| G | \| | L | 76 | +/− | | | | | | | | |

These signals are transmitted by a transmission line 24 which may be, for example, a coaxial conductor, or video microwave link. These signals are received by the standard color CRT receiving circuitry 25.

A switch 27 at the video 3D color camera controls the blanking pulses from pulse generator 23 to select either a flat image or a 3D image. To obtain a 2D image from the same video camera, the 3D control pulses from 23 are cut off and a 2D control voltage is substituted which allows only the right or left image to appear in the usual manner. Since the polarizing elements are colorless, the right or left image which appears on the CRT color TV screen may be viewed without the glasses in the normal manner, but then only a (2D) flat image will appear.

Returning to FIGS. 1 and 2, in the Depix Converter 10, the lower image 14 is transmitted over the prism deflector 30, utilizing the mirror deflectors 31 and 32 so that the optical axis 33 of the left image and the optical axis 34 of the right image are in the same horizontal plane and the images 13 and 14 of the object 11 are free of parallax. The deflector 35 deflects the right image to the prism deflector 30, which directs the right image via lens 12 to the area 13 at the aperture 9. A horizontal black bar 36 separates the images 13 and 14 in the same format now conventional on film used to project 3D in the Motion Picture art. The prism deflector 30 is angularly adjustable to converge the axes 33 and 34 at any suitable distance z from a reference plane 37. Lenses 38 and 39 image the object 11 via lens 12 onto the 3 color video tube apertures, respectively 9, 9′, 9″ for the R,B,G tubes.

A 3D TV CRT employing polarizing elements according to this invention is described:

intermediate areas 56 and 57, the dipoles are at random, that is, not oriented; therefore these areas substantially absorb all light, and provide a black absorbing surround or mask. A thin transparent conductor 51 is coated over the polarizing layer 50 as a sink for the electrons from the electron beam. The color phosphors 58, 59 and 60, blue, green and red respectively, are deposited in proximity to the polarizing layer 50; thus providing the polarizing and color pattern shown in a plan view in FIG. 3. The construction shown in FIGS. 3 and 4 will of course be understood to be a preferred embodiment of this invention, but other structures may be employed in lieu thereof, as for example, a polarized lens structure superimposed over the face of the color CRT.[6]

The structure shown in FIG. 4 is on the internal face of the CRT, within which a high vacuum must be maintained. It is customary to hard-seal the faceplate to the tube body at a temperature $T_1$ sufficient to fuse a glass or metal seal to provide a permanent joint to maintain the high vacuum without leakage over a long period of time. The joint is fused while all elements are heated to the temperature $T_1$, below the deformation temperature $T_2$ of the faceplate. Conventional organic polyiodide polarizers so widely used for other purposes cannot withstand temperatures in excess of about 100° C., which is usually much less than $T_1$. Consequently, the polarizers of this invention are dipoles in a glass layer. Glass dipole polarizers have been previously described.[7] They comprise submicron metal dipole particles which act as antennae resonating to visible light; that is, the dipoles have a length of about $\lambda/2n$ and a width of about $\lambda/20n$, where $\lambda$ is the wavelength of the light, and n is the index of the refraction of the glass, usually about 1.5. These submicron dipoles, preferable of an inert metal, for example chromium needles, are suspended in a fusible glass layer 50; which has a melting point $T_3$ which is greater than the sealing temperature $T_1$ of the faceplate to the tube, but less than the deformation temperature $T_2$ of the faceplate 48.

Figure 5:
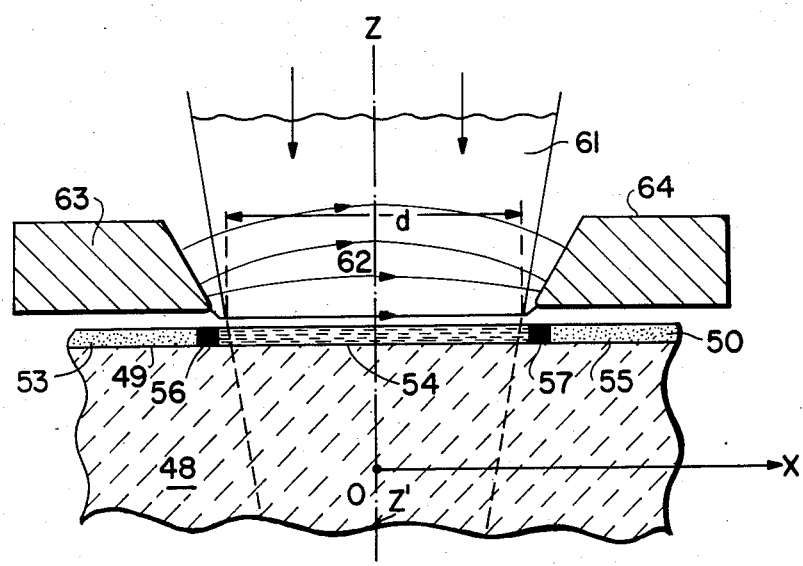

FIG. 5 shows a method of orienting the polarizing elements at each pixel. Only one polarizing element 54 is shown undergoing orientation, although it will be understood that a whole row or column can be simultaneously oriented.

In FIG. 5, the step of preparing the polarizing layer 50 and orienting the polarizing areas 53, 54 and 55 is shown together with the disoriented areas 56 and 57. In preparing the polarizing layer 50, a liquid suspension of dipole particles in a fluid such as water and/or alcohol is prepared, in which also is included a submicron suspension of fusible glass frit. Alternatively, a solution of an inorganic glass such as aluminum phosphate[8] glass is prepared, and the dipoles are suspended in this solution. This suspension is coated on the surface 49; for example, by spin-coating. The solvent is driven off at a moderate temperature $T_4$, the temperature is then increased to produce a uniform thin layer of glass containing a suspension of a random orientation of dipole particles. The layer is a strong absorber of radiation and appears jet black. The substrate and the coating is heated to a temperature $T_5$ which is just under the melting temperature $T_3$ of the coating 50. To orient the dipoles in the area 54, for example, a laser beam 61 is imaged onto the area 54, increasing its temperature to $T_3$ causing only area 54 to become liquid in the precise pattern required, usually a circular area of diameter d; for example, d=400 m$\mu$. The greatest temperature $T_3$ is of course, less than the support face glass deformation temperature $T_2$. In this condition, the dipoles may be oriented within the fluid by momentarily applying an electric field parallel to the surface 49. Typically the electric field intensity required for orientation of the dipoles is 5 to 50 volts per micrometer. Since the breakdown of electric field intensity in air at 1 Atm. is 3 V/m$\mu$ m the increased electric field intensity can be supported without spark breakdown by increasing the pressure of an inert gas (nitrogen) to 2 to 20 atmospheres. The electric field employed is preferably a square wave at a frequency of 1–10 Khz. The electric field is momentarily applied in the plane of the diagram, as shown at 54, between the electrodes 63 and 64 for a time just sufficient to orient the dipoles, for example, about 10 ms. By repositioning the electrodes about the axis ZZ' through a 90° rotation, the dipoles are oriented normal to the plane of the diagram at areas 53 and 55. A stepping motion may be employed in the XY plane to move the electrodes 63 and 64 and the laser spot 61 from place to place during the orientation procedure. When the laser beam is turned off while the orientation field is applied, the temperature of the surface area 52 quickly decreases and the oriented dipoles are frozen into position. In the next step, the conducting transparent layer 51 is applied, then the color phosphors 58, 59 and 60 are applied to the surface of the layer 51, and the tube is completed in the well known manner.

The above describes a complete 2D/3D compatible Color Video Camera, transmission means, control circuits and a 2D/3D compatible polarizing color CRT TV; which may be abbreviated: (2D/3D-CPC-CRT-TV), which provides intermixed stereo images on its face. A 3D image is seen by wearing the polarizing viewers 43 containing the orthogonally polarized lenses 44 and 45. In the event that only a flat 2D picture is transmitted, the polarized viewers are not worn. Since the polarizing elements are neutral in color, a flat 2D color image will appear in the usual manner.

Various modifications may be made of this invention without departing from the scope thereof. For example, a conventional 3D TV color camera may be employed with a single gun, and the right and left images scanned successively, instead of simultaneously; subsequently one image may be delayed so alternate pixels may be addressed with corresponding points on both right and left images; a longer acting phosphor may be used to hold the image between scans.

The means for the successive selection of adjacent pixels of the right and left images may be accomplished in any suitable manner, for example, (1) right and left adjacent images are focussed onto each of the color tubes simultaneously and scanned with two electron guns. (2) In another embodiment, the ray bundles from the right and left vantage points are first polarized orthogonally; then mixed and imaged onto a special polarizing screen in which successive pixels are polarized orthogonally; and this then images on each of the color tubes which have a single gun. (3) Electro-optic shutters 40,41 over the right and left lenses open/close, and then close/open for intervals equally the pixel length, controlled via leads 42,42', respectively.

High intensity color 3D CRT of the type herein described, may also be employed in a 3D TV projection system. The system described herein may be simplified to a single tube video camera, and corresponding black and white polarized CRT. The various embodiments which have been disclosed herein and not illustrated will be understood by those skilled in the art.

REFERENCES

1. U.S. Pat. No. 3,848,964 issued Nov. 19, 1974 Col. 10, Alvin M. Marks
2. U.S. Pat. No. 4,134,644 issued Jan. 16, 1979 3D Color Pictures with Multichrome Filters. Alvin M. Marks and Mortimer Marks.
3. U.S. Pat. No. 4,178,090 issued Dec. 11, 1979 3 Dimensional Camera Device, Alvin M. Marks and Mortimer Marks.
4. U.S. Pat. No. 4,175,829 issued Nov. 27, 1979 3 Dimensional Camera Devices, Alvin M. Marks and Mortimer Marks.
5. U.S. Pat. No. 3,990,087 issued Nov. 2, 1976 3 Dimensional Camera, Alvin M. Marks and Mortimer Marks.
6. I bid 2. FIGS. 6 and 7, Cols. 7 and 8.
7. U.S. Pat. No. 3,813,265 issued May 28, 1974, Electro-optical Dipolar Material, Alvin M. Marks.
8. New Inorganic Materials, J. D. Birchall and Anthony Kelly, Scientific American, May 1983 p. 104–114 particularly p. 114 re: Glassy Aluminum Phosphate Al PO$_4$, and bibliography p. 170.

Having fully described my invention, what I wish to claim is:

1. A 2D-3D compatible color TV transmitting and receiving system, comprising a 3 color tube video camera, a 3D optical converter having right and left lenses, said lenses receiving right and left images from horizontally spaced vantage points, said converter placing right and left color images as adjacent image pairs on each of said color tubes, a first means for selecting right and left color pixel signals alternately from corresponding points on each of said image pairs in each of said color tubes, a receiver for displaying said signals, a transmission link, transmitting said right and left color pixel signals to the said receiver via said link, adjacent light emitting color pixels on said receiver, said alternate right and left pixel signals successively and alternately controlling the light emitted by the said adjacent color pixels, and a second means to alternately transmit and block light from the said adjacent right and left color pixels, whereby the light from the said right color pixels comprising said right image is transmitted only to the right eye of an observer, and whereby the light from the said left color pixels comprising the said left image is transmitted only to the left eye of the said observer, said right and left images being fused by the observer to appear as a spacial 3D-TV color image.

2. A 2D-3D TV system according to claim 1 in which the light emitting pixels successively comprise red blue and green color phosphors.

3. A system as in claim 2, in which said second means comprises orthogonally oriented polarized elements over each adjacent right and left light emitting phosphor color pixel and a polarized viewer to be worn over the eyes of an observer, orthogonally oriented right and left polarized elements mounted in said viewer, whereby the said right pixel image is transmitted by the said right polarized element only to the right eye of said observer, and said left pixel image is transmitted by the said left polarized element only to the left eye of said observer, said right and left images being fused by the observer to appear as a spacial 3D-TV color image.

4. A 3D-TV system according to claim 1, further comprising dual electron beam guns on each of said 3 color tubes; corresponding pixels on said right and left image pairs in each of said tubes, said dual electron beams simultaneously scanning the said corresponding pixels on said right and left images, a control circuit, pulse trains from said circuit to eachh said electron gun in each of said tubes, said pulse trains blocking or passing signals from said corresponding pixels, whereby said corresponding pixel signals from said right and left images are alternately transmitted.

5. In a 2D-3D TV system according to claim 1, further comprising a 3 color tube video camera, an image plane on each said color tube, a single electron beam gun in each said color tube, a 3D optical converter attached to said camera, a first polarizer in the right lens path and a second polarizer in the left lens path of the said converter, said first and second polarizers being orthogonally oriented with respect to each other, said right and left images from said optical converter being overlapped and orthogonally polarized on each said image plane of each said color tube, a polarized color pixel screen located at each of said image planes, the adjacent color pixels on each of the said pixel screens being polarized orthogonally to that of the adjacent pixel, whereby each said electron beam scans said adjacent right and left color pixels successively and alternately.

6. In a 3D-TV system according to claim 1, further comprising a 3 color tube video camera, single electron beam guns on each said tube, a 3D optical converter attached to the said camera, a right optical axis and a left optical axis on said converter, right and left images from said converter overlapping on the image planes of the said color tubes, a first electroopitcal shutter along the right optical axis of said converter, a second electro-optical shutter along the left optical axis of said converter, said first shutter being open when said second shutter is closed, and vice-versa, the open/shut frequency being equal to the scanning rate of the said video camera for two adjacent pixels, whereby adjacent color pixels are scanned successively and alternately.

7. In a 2D-3D compatible color TV system a camera according to claim 1, further comprising a control circuit for providing alternate blocking and transmission of signals from adjacent pixels for 3D-TV, and steady transmission for 2D-TV, a selection switch on said control circuit, and means to actuate said switch to select 2D or 3D image transmission.

8. A 2D-3D compatible color polarized CRT comprising a standard CRT tube, a plurality of red, blue and green phosphor pixel-areas on the inner surface of the faceplate of said tube, an inorganic polarizing layer on the inner surface of said faceplate between said phosphor pixel-areas and said faceplate, the polarizing orientation of the said polarizing layer under each pixel-area being orthogonal to that of the adjacent pixel-area.

9. In a process for manufacturing a 2D-3D compatible color polarized CRT tube having a faceplate with blue, green and red pixel-areas in which the polarizing plane of each of the said pixel-areas is orthogonal to that of the adjacent pixel-area, forming a suspension of submicron metal dipoles in an inorganic material capable of existing in the fluid state or the solid state, coating the said dipole suspension onto the inner surface of the faceplate of said CRT tube, establishing a local electric field to cause a local orientation of the said dipoles at each of the said pixel-areas while the said material is in a fluid state, and fixing the local orientations of the said dipoles in the said suspension layer by solidifying said material.

10. In a process according to claim 9, including the further step of focusing a laser beam from a laser onto said pixel-area, said laser beam being of such power as to cause said suspension material to momentarily become fluid locally only in the said pixel-area, applying an electric field parallel to the plane of said coating in said pixel-area while said material in said pixel-area is in the fluid state, orienting said dipoles in said pixel-area only; and thereafter, turning said laser beam off, whereby the said material is solidified and the orientation of the said dipoles is permanently fixed in said pixel-area.

* * * * *